April 11, 1939.   J. D. KENDALL   2,153,930

SENSITIZED PHOTOGRAPHIC EMULSION

Filed Jan. 15, 1937

2.2'-di-B-Naphthathiazolyl-Formamidine 1.1'-di-∝-Naphthathiazolyl-Formamidine 1-(p-Dimethylamino-Benzal)-Aminobenzthiazole 1-(1.3.3'-Trimethylindolylidene-2')-Ethylidene-Aminobenzthiazole INVENTOR.
John David Kendall.

BY *Lynn B. Morris*
ATTORNEY

Patented Apr. 11, 1939

2,153,930

UNITED STATES PATENT OFFICE 2,153,930

SENSITIZED PHOTOGRAPHIC EMULSION

John David Kendall, Ilford, England, assignor to Ilford Limited, Ilford, Essex, England, a British company Application January 15, 1937, Serial No. 120,739
In Great Britain May 8, 1935

10 Claims. (Cl. 95—7)

This invention consists in improvements in or relating to sensitizing photographic silver halide emulsions.

This application is a continuation-in-part of my copending application Serial No. 77,441, filed May 1, 1936.

The colour sensitive range of photographic silver halide emulsions has been extended by incorporating in the emulsion many different compounds, including dyestuffs of the cyanine and of the pinaflavol classes. The cyanine dyestuffs consist of a heterocyclic nitrogen nucleus, containing a quinquevalent nitrogen atom such as that in a quaternary salt, linked to a heterocyclic nitrogen nucleus containing a trivalent nitrogen atom by a methine or polymethine chain. The pinaflavol dyestuffs consist of a heterocyclic nucleus containing a quinquevalent nitrogen atom which is linked to a trivalent nitrogen atom by a conjugate chain of carbon atoms part of which is included in a homocyclic ring. In my British specification No. 447,109 which corresponds to U. S. Patents 2,080,049 and 2,080,050 I have described the sensitization of photographic silver halide emulsions with dyes similar in structure to the cyanines and pinaflavols, but in which the two nuclei are linked by a nitrogen atom or by a conjugate chain of nitrogen and carbon atoms. An essential feature of the above-mentioned compounds is the presence of a quinquevalent nitrogen atom linked by a completely conjugate chain to a trivalent nitrogen atom. It has generally been supposed that it is the presence of this system which imparts the sensitizing action to the compounds and that compounds which do not contain the system would not possess sensitizing properties.

In British patent specification No. 428,360, however, I have described dyestuffs which do not contain a quinquevalent nitrogen atom and yet possess sensitizing properties. The dyestuffs described in that specification are derived from 5-pyrazolone and I considered that the sensitizing properties were bound up with the presence of the pyrazolone nucleus in the dyestuff. Further consideration has now shown that these dyes contain a system comprising two trivalent nitrogen atoms linked by a conjugate chain of an odd number of carbon atoms, and my subsequent investigations have shown that the presence of such a system imparts sensitizing properties to compounds other than pyrazalone derivatives. thus I have found that the bases corresponding to the salts employed in the process described in British specification No. 447,109 possess strong sensitizing properties.

According to the present invention a method of sensitizing photographic silver halide emulsions comprises incorporating in the emulsion an organic nitrogenous base consisting of a heterocyclic nitrogen nucleus linked by a nitrogen atom or by a chain of carbon atoms and at least one nitrogen atom to a second nucleus which is either a heterocyclic nitrogen nucleus or an amino substituted arylene ring, all the nitrogen atoms in the compound being trivalent and at least two of them being joined by a completely conjugate chain of an odd number of carbon atoms.

The compounds which may be used in accordance with the present invention are similar in structure to the bases of the cyanine and the pinaflavol types of dyestuff except that the linking chain consists either of a single nitrogen atom or a chain of nitrogen and carbon atoms.

The preparation of some of the compounds which may be employed in accordance with the present invention is described in the specification of British Patent No. 447,038 which corresponds to U. S. Patents 2,080,049 and 2,080,050.

In carrying out the present invention in practice one or more of the compounds to be used in accordance with the present invention may be incorporated in the photographic silver halide emulsion before it is coated on a support, or alternatively the support (e. g. a film or a plate) coated with the emulsion may be bathed in a solution of one or more of the compounds. The actual quantity of the compound incorporated in the emulsion will vary to a certain extent with the individual compounds, and with the ultimate effect which it is desired to obtain. As an indication of the order of the quantities employed 100 ccs. of a one in one thousand solution of the dye may be incorporated in six and a half litres of emulsion equivalent to about two hundred and fifty grammes of silver nitrate or the coated support may be bathed in a one in one thousand solution of the compound. The strength of the solution may vary according to the dye used and may be as low as one in ten thousand.

The following examples of compounds which may be used in accordance with the invention are given by way of example only:

(1) 2.2'-dithiazolyl formamidine

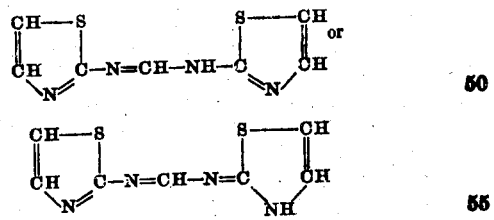

extends the sensitivity of a silver chloride photographic emulsion to about λ 4550 Å. with a maximum effect at about λ 4220 Å.

(2) 2,2'-di-β-naphthathiazolyl-formamidine

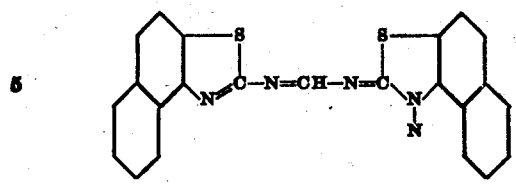

extends the sensitivity of a silver chloride photographic emulsion to about λ 5000 Å. with a maximum effect at about λ 4600 Å.

(3) 1,1'-di-α-naphthathiazolyl-formamidine

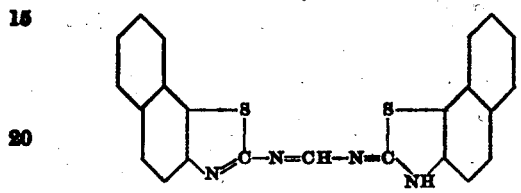

extends the sensitivity of a silver chloride photographic emulsion to about λ 4800 Å.

(4) 1:1' dibenzthiazolyl-formamidine

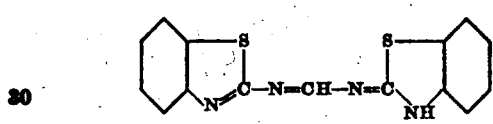

extends the sensitivity of a silver chloride photographic emulsion to about λ 4700 Å. with a maximum effect at about λ 4400 Å.

(5) 5:5'-diethoxy 1:1' dibenzthiazolyl-formamidine is a powerful sensitizer and extends the sensitivity of a silver chloride emulsion to about λ 5000 Å. with a maximum effect at about λ 4600 Å.

(6) 2-(paradimethylamino-benzal) - amino-β-naphthathiazole

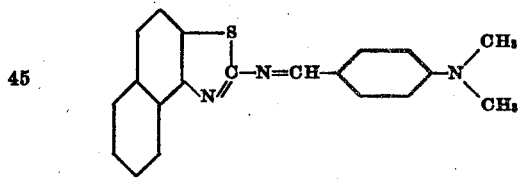

extends the sensitivity of a silver chloride photographic emulsion to about λ 5400 Å. with a maximum effect at about λ 4500 Å.

(7) 1-(paradimethylamino - benzal) - amino-benzthiazole

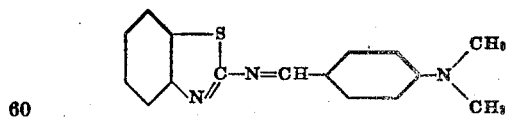

extends the sensitivity of a silver chloride photographic emulsion to about λ 5400 Å. with an indeterminate maximum effect at about λ 4600 Å. This compound is described as 2-para-dimethylamino-benzalaminobenzthiazole in Example V of British patent specification No. 447,038 where its method of preparation is given.

(8) 5-ethoxy-1-(paradimethylamino - benzal) - amino benzthiazole

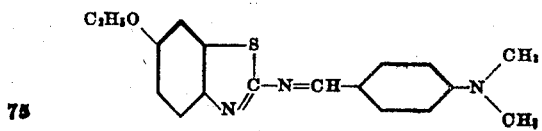

extends the sensitivity of the silver chloride photographic emulsion to about λ 5500 Å. with a maximum effect at about λ 4700 Å.

(9) 1-(N-methyldihydroquinolylidene-2')-aminobenzthiazole

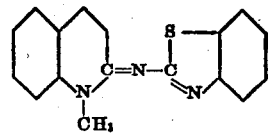

is a powerful sensitizer and extends the sensitivity of silver chloride emulsions to about λ 4900 Å. with an indeterminate maximum at about λ 4400 Å.

(10) 1-(N - methyldihydrobenzoxazolylidene)-aminobenzthiazole is a sensitizer and increases the normal sensitivity of a silver chloride emulsion extending the colour range to about λ 4000 Å. with a maximum at about λ 3850 Å.

(11) 1-(N - methyldihydrobenzthiazolylidene)-aminobenzthiazole is a sensitizer and increases the normal sensitivity of a silver bromide emulsion within its own region and extends the colour sensitivity to about λ 4000 Å. with a maximum at about λ 3850 Å.

(12) 1-(N-ethyl-5:6 - benzdihydrobenzthiazolylidene)-amino-benzthiazole is a sensitizer and extends the sensitivity of a silver chloride emulsion to about λ 4200 Å. with a maximum at about λ 3950 Å. This compound may be prepared from 1-ethylthiol-5:6-benzbenzthiazole etho-paratoluene sulphonate and 1-aminobenzthiazole in pyridine solution.

(13) 1-(N-methyldihydrobenzthiazolylidene-amino-5:6-benzbenzthiazole is a sensitizer and extends the sensitivity of a silver chloride emulsion to about λ 4200 Å. with a maximum at about λ 4000 Å. This compound may be prepared from 1-methylthiol - benzthiazole metho-paratoluene sulphonate and 1-amino-5:6-benzbenzthiazole in pyridine solution.

(14) 1-(1':3':3' - trimethylindolylidene - 2')-ethylidene-amino-benzthiazole

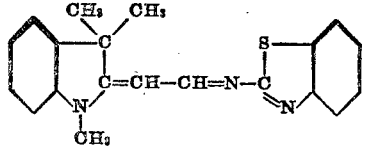

is a powerful sensitizer and extends the sensitivity of a silver chloride emulsion to λ 5300 Å. with a maximum at about λ 5000 Å. The preparation of this compound is described in Example XV of British patent specification No. 447,038.

Representative sensitivity curves of the above-described emulsions are shown in the accompanying drawing, in which.

Figure 1:
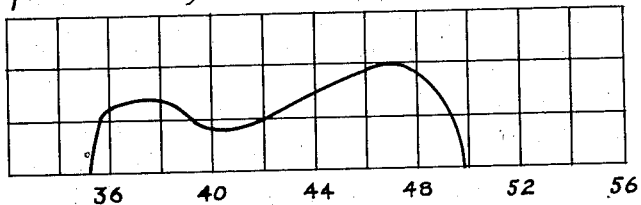
Fig. 1 is a spectrogram of a silver chloride emulsion containing 2,2'-di-β-naphthathiazolylformamidine.
Figure 2:
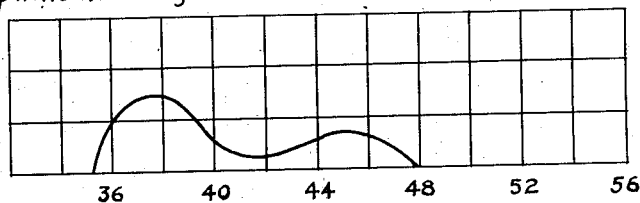
Fig. 2 is a spectrogram of a silver chloride emulsion containing 1:1' di-α-naphthathiazolylformamidine.
Figure 3:
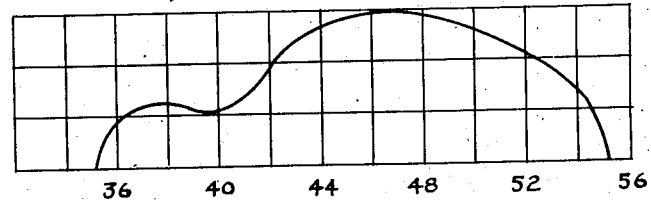
Fig. 3 is a spectrogram of a silver chloride emusion containing 1-(p-dimethylaminobenzol)-aminobenzthiazole.
Figure 4:
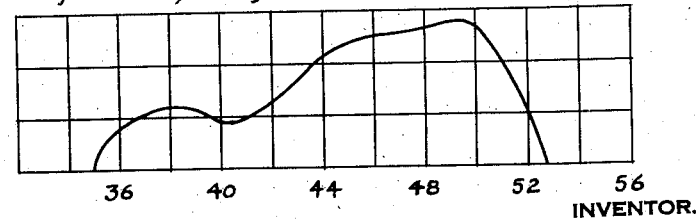
Fig. 4 is a spectrogram of a silver chloride emulsion containing 1-(1':3':3'-trimethylindolylidine-2') ethylidene aminobenzthiazole.

I claim:
1. A photographic silver halide emulsion containing in sensitizing amounts an organic binuclear nitrogenous base compound in which all nitrogen atoms are trivalent, and separated from each other by an odd number of carbon atoms, selected from the group consisting of compounds of the general formula:

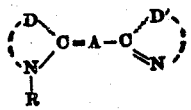

and compounds of the general formula:

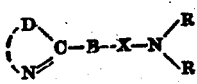

wherein D and D' represent the atoms necessary to complete a heterocyclic nitrogen nucleus taken from the group consisting of 5-member and 6-member heterocyclic nitrogen ring nuclei of the type contained in cyanine dyes, the R's represent a member of the group consisting of hydrogen and lower alkyl, A is a trivalent bridging radical selected from the group consisting of =N—CH=N—, =CH—CH=N—, and =N—, B represents a bivalent bridging radical of the formula —N=CH—, and X represents a phenylene radical.

2. A photographic silver halide emulsion containing in sensitizing amounts an organic binuclear nitrogenous base compound in which all nitrogen atoms are trivalent and having the general formula:

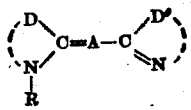

wherein D and D' represent the atoms necessary to complete a heterocyclic nitrogen nucleus taken from the group consisting of 5-member and 6-member heterocyclic nitrogen ring nuclei of the type contained in cyanine dyes, R is a member of the group consisting of hydrogen and lower alkyl and A is a trivalent bridging radical selected from the group consisting of =N—CH=N—, =CH—CH=N—, and =N—.

3. A photographic silver halide emulsion containing in sensitizing amounts an organic binuclear nitrogenous base compound in which all nitrogen atoms are trivalent and having the general formula:

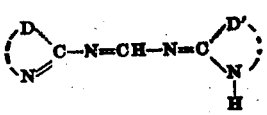

wherein D and D' represent the atoms necessary to complete a heterocyclic nitrogen nucleus taken from the group consisting of 5-member and 6-member heterocyclic nitrogen ring nuclei of the type contained in cyanine dyes.

4. A sensitized photographic silver halide emulsion which has incorporated in it as the sensitizer 1:1'-dibenz-thiazolylformamidine.

5. A sensitized photographic silver halide emulsion which has incorporated in it as the sensitizer a dithiazolylformamidine.

6. A photographic silver halide emulsion containing in sensitizing amounts an organic binuclear nitrogenous base compound in which all nitrogen atoms are trivalent and having the general formula:

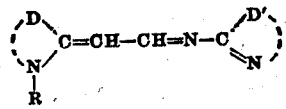

wherein D and D' represent the atoms necessary to complete a heterocyclic nitrogen nucleus taken from the group consisting of 5-member and 6-member heterocyclic nitrogen ring nuclei of the type contained in cyanine dyes, and R is a member of the group consisting of hydrogen and lower alkyl.

7. A sensitized photographic silver halide emulsion which has incorporated in it as the sensitizer 1:3:3-trimethylindolylidine-2:1'-ethlidene-amino-benzthiazole.

8. A photographic silver halide emulsion containing in sensitizing amounts an organic binuclear nitrogenous base compound in which all nitrogen atoms are trivalent and separated from each other by an odd number of carbon atoms and having the general formula:

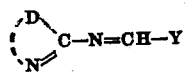

wherein D represents the atoms necessary to complete a heterocyclic nitrogen nucleus taken from the group consisting of 5-member and 6-member heterocyclic nitrogen ring nuclei of the type contained in cyanine dyes, and Y is an amino aryl radical.

9. A sensitized photographic silver halide emulsion which has incorporated in it as the sensitizer a 1-(para-dimethylaminobenzal)-amino-benzthiazole.

10. A sensitized photographic silver halide emulsion which has incorporated in it as the sensitizer 1-(para-dimethylaminobenzal)-amino-benzthiazole.

JOHN DAVID KENDALL.

Certificate of Correction

Patent No. 2,153,930.  April 11, 1939.

JOHN DAVID KENDALL

It is hereby certified that error appears in the printed specification of the above numbered patent requiring correction as follows: Page 2, first column, lines 2 to 9, in the formula, for

and that the said Letters Patent should be read with this correction therein that the same may conform to the record of the case in the Patent Office.

Signed and sealed this 25th day of July, A. D. 1939.

[SEAL]

HENRY VAN ARSDALE,
*Acting Commissioner of Patents.*